Oct. 2, 1951  F. PRIOR  2,569,493
VEHICLE FUEL TANK ASSEMBLY
Filed May 29, 1948  2 Sheets-Sheet 1
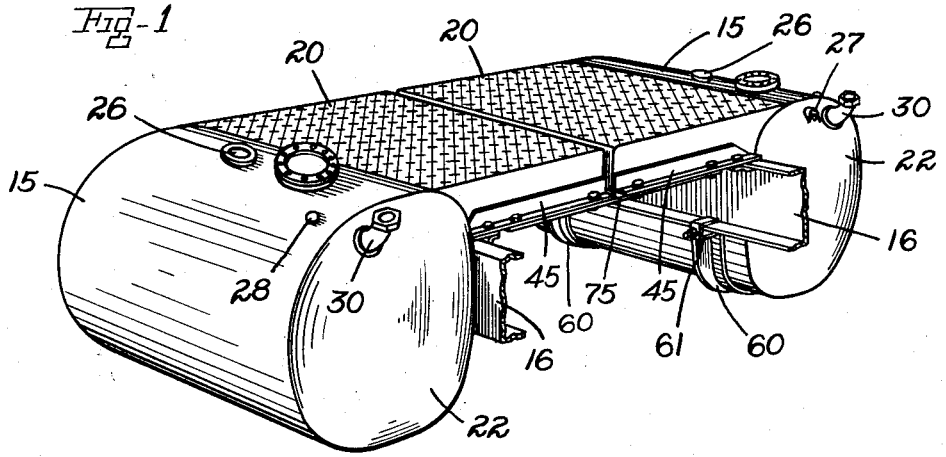
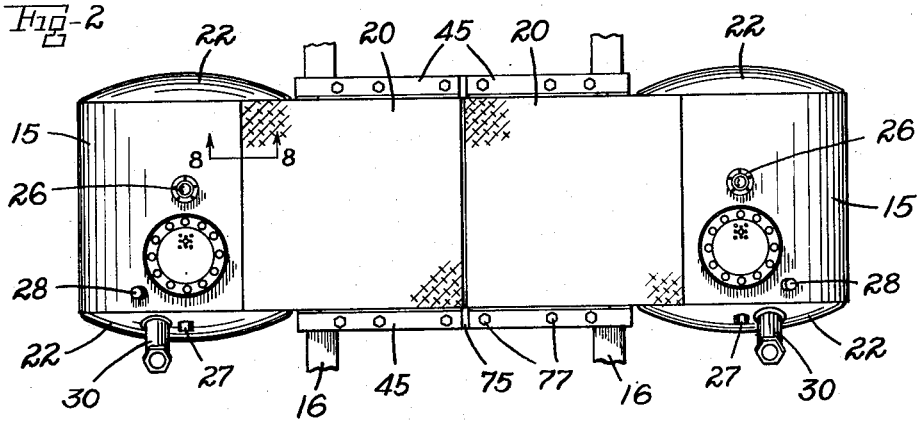
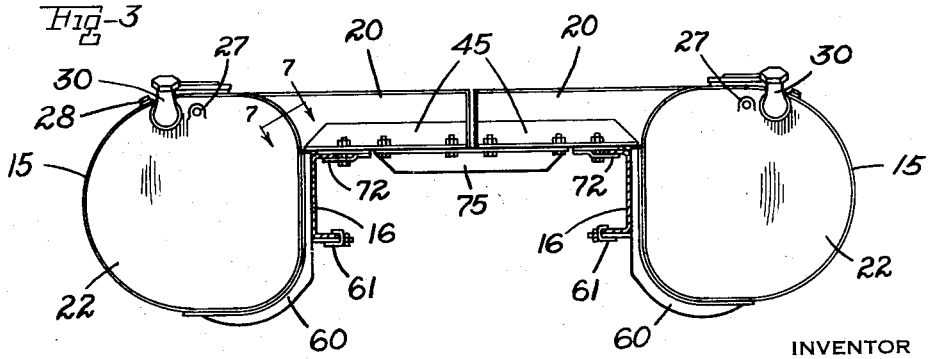
INVENTOR
Fred Prior
BY Marechal & Biebel
ATTORNEYS

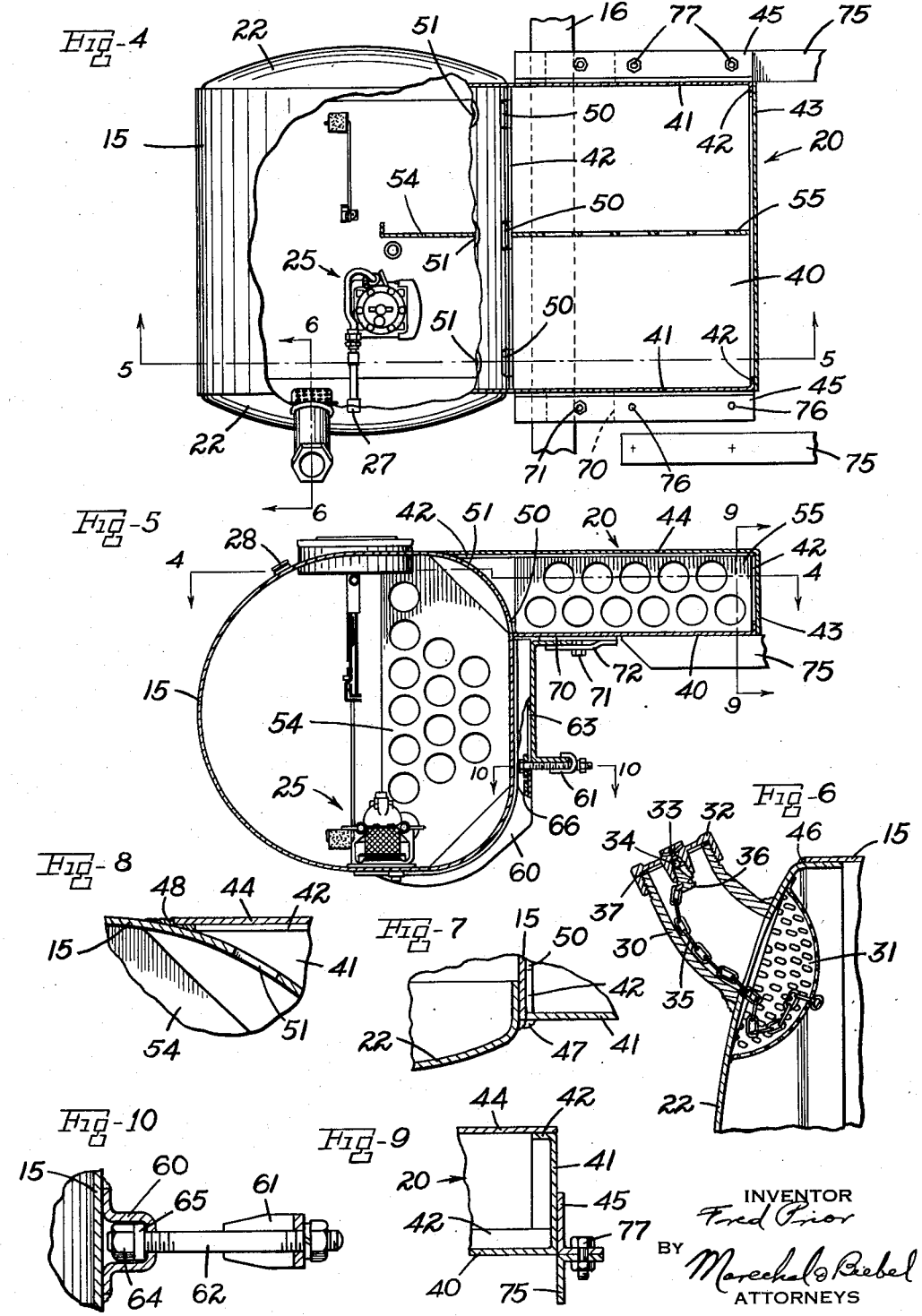

Patented Oct. 2, 1951

2,569,493

UNITED STATES PATENT OFFICE 2,569,493

VEHICLE FUEL TANK ASSEMBLY

Fred Prior, Dallas, Tex.

Application May 29, 1948, Serial No. 30,165

6 Claims. (Cl. 280—5)

This invention relates to fuel tanks for use by trailer trucks and like motor vehicles.

One of the principal objects of the invention is to provide a fuel tank assembly for mounting in overhanging relation with the frame of a trailer truck or like motor vehicle, which is of high strength and capable of withstanding severe conditions in use without breakdown, which will afford maximum storage capacity for fuel without undesirable bulk, and which is readily adapted to vehicle frames of different widths to be received securely upon frames of substantially any standard width and thus to give maximum stability and safety.

Another object is to provide such a fuel tank assembly which includes main or side tank portions adapted for mounting on the outer sides of the vehicle frame and laterally extending shell portions adapted to lie across the frame, and in which the lateral shell portions of opposite sides are adjustably spaced in accordance with the width of a particular vehicle frame to position the main or side tanks in closely fitting engagement with the sides of the frame for any frame width.

An additional object is to provide such a fuel tank assembly wherein the component units of the assembly are securely connected to the truck frame in adjustably spaced relation to allow deflection of the vehicle frame in use without danger or injury to the fuel containing tanks.

It is also an object of the invention to provide such a fuel tank assembly wherein the component units are of standard size for individual mounting in close fitting relation with the outer sides of the vehicle frame and wherein these units may be quickly and readily secured together in rigid relation to maintain the proper spacing in accordance with the width of the particular vehicle frame.

Other objects and advantages of the invention will be apparent from the following description, the accompanying drawings and the appended claims.

In the drawings:

Fig. 1 is a view in perspective illustrating a mounted fuel tank assembly in accordance with the invention with the vehicle frame shown fragmentarily;

Fig. 2 is a top plan view of the mounted assembly;

Fig. 3 is a view of the mounted assembly in end elevation;

Fig. 4 is a plan view on a larger scale of one of the units of the assembly, the view being partly broken away and in section on the line 4—4 of Fig. 5;

Fig. 5 is a section on the line 5—5 of Fig. 4;

Fig. 6 is a detail view of the intake port assembly taken in section on the line 6—6 of Fig. 4;

Fig. 7 is an enlarged fragmentary view showing a structural detail, the view being taken in section on the line 7—7 of Fig. 3;

Fig. 8 is a view similar to Fig. 7 taken in section on the line 8—8 of Fig. 2;

Fig. 9 is an enlarged fragmentary section on the line 9—9 of Fig. 5; and

Fig. 10 is a view of one of the mounting clamps taken in section on the line 10—10 of Fig. 5.

Referring to the drawings, which illustrate a preferred embodiment of the invention, Figs. 1 to 3 show a complete fuel tank assembly comprising a pair of separate tank units each including a main shell 15 mounted in horizontal position along the outside of one of the frame channels 16 of a truck, the forward end of the assembly being shown in Figs. 1 and 3. Each unit includes a lateral shell 20 of generally rectangular configuration extending inwardly from the upper portion of main shell 15 above channel 16, and the interior of lateral shell 20 is in direct communication with the interior of main shell 15 to form the two shell portions into effectively a single tank.

The construction and internal arrangement of each tank unit are shown in enlarged detail in Figs. 4 to 10. Each main shell 15 is generally cylindrical in transverse section, having flattened portions along the inboard side adjacent channel 16 and also along the top and bottom in accordance with the disclosure of applicant's copending application Serial No. 782,349, filed October 27, 1947. Each main shell is provided at each end with a belled head 22, and an electric fuel pump is indicated at 25. Each main shell is also provided with an indicating gage 26, an outlet coupling 27 and a fuse plug 28, and it will be noted that these fittings are located as far forward as practicable, this arrangement being advantageous for use on the tractor of a trailer truck to minimize danger of damage from contact with the nose of the trailer if the tractor should encounter an abrupt incline.

The intake port assembly (Fig. 6) for each unit includes a cast iron filler neck 30 which is arc welded in place over a pierced opening in the forward tank head 22, this opening being so located with respect to the top of the tank as to provide a trapped air space above the maximum fluid level equivalent to approximately 4% of the gross volume of the tank to compensate for expansion of the liquid fuel. An anti-syphon screen 31 is arc welded within head 22 in such position as to cover the intake port. A screw type cap 32 for neck 30 includes a combination vent port 33 and ball check valve 34 which prevents the escape of fuel in the event that the tank is accidentally inverted. The cap 32 is anchored to the tank by means of a retaining chain 35, one end of which is attached to the anti-siphon screen 31 and the other end of which is provided with a swiveled connection to the cap 32 by means of a grooved boss portion in the slotted vent plug 36 threaded into cap 32 to retain ball 34. An airtight seal between the cap 31 and filler neck 30 is provided by a washer-type gasket 37 of a composition material impervious to gasoline.

The bottom 40 of the lateral shell 20 is formed from a single blank of suitable sheet stock, such as 16-gage hot-rolled steel, folded upwardly to form front and rear end walls 41. This sheet is also flanged at 42 along all edges except the outboard edges of the end walls 41 to provide welded lap joints to the inboard side wall 43 and top 44, these portions 43 and 44 being formed from a second blank of sheet steel. A similar welded lap joint is provided between the flange 42 at the outboard edge of bottom 40 and the side of the main shell 15, as shown in Figs. 4 and 5, and angle irons 45 are welded to each end wall 41 for use in securing together the lateral shells of the two units.

In order to provide maximum strength and rigidity at the vertical joints between the two shells 15 and 20, the outboard edges of the end walls 41 of lateral shell 20 are curved to fit the curvature of the upper corners of main shell 15 and are secured thereto in a three-way joint with the main shell heads 22. As shown in Fig. 7, these curved edges of end walls 41 are welded directly to the bead 46 (Fig. 6) initially formed in welding heads 22 to main shell 15, thus forming a two-pass bead 47 and a strong homogeneous joint at these important positions. The top 44 of the lateral shell is welded to the top of main shell 15 at 48 (Fig. 8) to complete the connection between the two shells, the top 44 being substantially coplanar with the flattened top portion of shell 15 to provide a lap joint at the junction therebetween.

Free transmission of fluid between the shells 15 and 20 is provided for by two rows of holes pierced in the wall of the main shell. As shown in Figs. 4 and 5, the lower row of holes 50 (three being shown) is located along the bottom of shell 20, with the low edge of each hole substantially tangent to the upper surface of the bottom 40 and two of these holes being located adjacent opposite ends of shell 20 to assure complete drainage to shell 15 regardless of the fore and aft position of the tank. The holes 51 in the upper row serve as air vents between the two shells and are located near the top of main shell 15, just below the cover 44 of the lateral shell.

This construction and the widely spaced arrangement of holes 50 and 51 leaves intact the major portion of the wall of main shell 15 between the interiors of the two shells to assure maximum rigidity, the holes 50 and 51 constituting the only interruption in the otherwise circumferentially continuous construction of shell 15. It will also be noted that each shell is provided with a baffle plate to support the flat surfaces thereof and to subdue the inertia of the fore and aft rush of fluid, the baffle 54 for the main shell and baffle 55 for the lateral shell each being formed of steel plate perforated with staggered holes of substantial diameter to reduce weight without impairing any structural functions.

The main shell 15 of each unit is provided with a pair of J-shaped reinforcing channel members 60, which are formed to fit the inboard and bottom surfaces of the shell and are arc welded thereto. The vertical section of each of these channels 60 bears against the outer surface of the adjacent frame channel 16, and it is clamped thereto by means of a hook type clamp 61 and a stud bolt 62 which passes through a slotted opening 63 in channel 60 and engages a nut 64 tack welded to a rectangular washer 65 of sufficient size to be held against turning within channel 60. A stop member 66 is welded within each channel 60 just below the lower end of slot 63 to limit downward movement of the nut and washer 64—65 for facilitating assembly operations. The slot 63 and stud bolt arrangement thus provide ready adjustability of clamp 61 for frame channels 16 of different sizes to secure shell 15 in rigid lateral relation with the frame.

The lateral shell 20 of each unit is also releasably clamped to a frame channel 16. A flat plate 70 is welded to the under surface of each angle 45 and bears upon the upper flange of channel 16 to serve as a spacer providing clearance for any rivet heads which might occur along the frame. Each of these spacers 70 and angles 45 have a matching hole for receiving a cap screw 71 which cooperates with a bar clamp 72 to clamp the tank unit to the upper flange of channel 16. As shown in Fig. 5, the ends of the clamp 72 are relatively offset to compensate for the thickness of channel 16 in order to maintain the clamping surfaces as nearly parallel as possible.

In mounting this assembly upon a truck frame, the separate units are set in position before connection to each other to assure mounting of the main shells 15 in closely fitting engagement with the frame channels for desired stability in use. Splice angles 75 of sufficient length to span the inboard pair of bolt holes 76 (Fig. 4) in angles 45 are then clamped or otherwise temporarily secured to the underside of angles 45 with their free legs extending downwardly, these bolt holes in angles 45 being normally drilled at the factory. After proper alignment of the two units, holes are drilled in the splice angles matching these existing bolt holes 76 in angles 45. The angles 75 are then bolted in place by bolts 77, and the clamps 61 and 72 are similarly secured in position at a desired stage in the assembly operation.

It will be seen that this construction and mounting arrangement provides for securing the two tanks rigidly together in selectively spaced relation in accordance with the lateral spacing of the frame channels 16 to maintain the main shells 15 fitted closely against the frame channels. At the same time, however, the angles 75 support only a minor fraction of the weight of the assembly, the major portion being carried by the clamps 61 and 72 and by the cooperating relation of the lateral shells with the frame channels 16. It has also been found with this construction that twisting resulting from deflection of the truck frame is substantially absorbed in the connection between the units without injury to the tanks themselves such as might result if they were integrally connected. An added safety factor is afforded by the fact that the spliced connection of the units reinforces the clamps which secure the shells to the frame channels, and also guards against danger of the loss or misalignment of the tanks in the event any of the clamps should fail in use.

The fuel tank assembly of the invention possesses substantially the same advantages as a unitary saddle tank with respect to increased capacity, the lateral shells in each unit of the relative proportions shown providing approximately 20% increase in volume over the volume of the main shells alone. The invention also provides a fuel tank assembly which is superior to a unitary saddle tank from the standpoint of safety as well as economy of manufacture. Thus the tanks of the invention can be manufactured in accordance with a single standard set of dimensions to fit equally well any truck frame regardless of width, and with the lateral dimensions of the lateral shells predetermined in accordance with the narrowest truck frame for which the assembly of a given capacity is designed, the arrangement of the angles 45 and 75 provides for connecting the two component units of the assembly in selectively spaced relation such that the main tanks are maintained in the desired close and rigidly engaged relation with the frame channels to assure stability and balance for proper safety, leaving no possible lateral clearance between the overhanging portions of the main shells and the channel frames which could permit relative angular movement of these parts during operation of the truck and resulting development of stresses at the connections between the two shells.

Reference is made to my copending application Serial No. 81,680, filed March 16, 1949, as a continuation in part of this application.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A fuel tank assembly of the character described for mounting on the frame of a motor vehicle and comprising a pair of separate tank units, each said unit including a main shell adapted for horizontal mounting along the outer side of said frame and a lateral shell projecting from the upper portion of said main shell with the interior thereof communicating with the interior of said main shell, means for mounting said main shell of each said unit outwardly of said frame with said lateral shell extending inwardly therefrom and above said frame into laterally spaced relation with said lateral shell of said other unit, flanges projecting from each of said lateral shells in lateral relation with said frame and provided with spaced bolt holes, and connecting members having bolt holes therein coinciding with said bolt holes in said flanges and spaced in accordance with the width of said frame to receive bolts for securing said lateral shells in rigidly spaced relation maintaining said main shells in closely fitting relation with said frame.

2. A fuel tank assembly of the character described for mounting on the frame of a motor vehicle and comprising a pair of separate tank units, each said unit including a generally cylindrical main shell adapted for horizontal mounting along the outer side of said frame and a lateral shell projecting from the upper portion of said main shell with the interior thereof communicating with the interior of said main shell, J-shaped reinforcing members welded to each of said main shells in position to abut the sides of said frame, the lower portions of said J-shaped members extending beneath said main shells in supporting relation with said shells, adjustable means for clamping said reinforcing members to said frame to support said units with said lateral shells extending inwardly of and above said frame, flanges projecting from said lateral shells, means for releasably clamping said flanges directly to said frame, and means for securing said flanges together to maintain said units in rigidly spaced relation in accordance with the width of said frame.

3. In a fuel tank assembly of the character described for mounting on the frame of a motor vehicle, a tank unit comprising a generally cylindrical main shell adapted for mounting horizontally along the outer side of said frame, a lateral shell of generally rectangular configuration formed separately from said main shell and arranged to project from the upper part of said main shell, the outboard side of said lateral shell being curved to fit the curvature of the outer surface of said main shell, said shells being welded together along the entire outboard periphery of said lateral shell to form a single tank, said main shell having a plurality of holes therethrough within the surface area thereof enclosed by said lateral shell to connect the interiors of said shells, said holes being relatively widely spaced to leave a substantial proportion of said enclosed area of said main shell in circumferentially continuous relation with the remainder of said main shell for maximum strength and rigidity.

4. In a fuel tank assembly of the character described for mounting on the frame of a motor vehicle, a tank unit comprising a generally cylindrical main shell adapted for mounting horizontally along the outer side of same frame, a lateral shell of generally rectangular configuration formed separately from said main shell and arranged to project from the upper part of said main shell, the outboard side of said lateral shell being curved to fit the curvature of the outer surface of said main shell, said shells being welded together along the entire outboard periphery of said lateral shell to form a single tank, said main shell having a plurality of holes therethrough within the surface area thereof enclosed by said lateral shell and adjacent the top of said lateral shell to form air vents between the interiors of said shells, said main shell having a second plurality of holes adjacent and above the bottom of said lateral extension for passage of liquid fuel between the interiors of said shells, there being one of said second plurality of holes adjacent each end of said lateral shell to assure free flow of fuel from said lateral shell to said main shell in any position fore and aft of said unit, the major portion of said main shell between said holes being circumferentially continuous with the remainder of said main shell for maximum strength and rigidity.

5. In a fuel tank assembly of the character described for mounting on the frame of a motor vehicle, a tank unit comprising a generally cylindrical main shell adapted for mounting horizontally along the outer side of said frame, belled head portions are welded to the ends of said main shell to leave circumferential welding beads, a lateral shell of generally rectangular configuration projecting from the upper part of said main shell, the outboard edges of the ends of said lateral shell being curved to fit the curvature of the outer surface of said main shell, said curved edges being arc welded to said welding beads to provide three-way welded joints, the top and bottom of said lateral shell being arc welded to said main shell with said top of said lateral shell in substantially coplanar relation with the top of said main shell, and said main shell having holes therethrough within the area bounded by said welds to provide communication between the interiors of said shells.

6. In a fuel tank assembly of the character described for mounting on the frame of a motor vehicle, a tank unit comprising a generally cylindrical main shell adapted for mounting horizontally along the outer side of said frame, belled head portions arc welded to the ends of said main shell to leave circumferential welding beads, a lateral shell projecting from the upper part of said main shell, the bottom and ends of said lateral shell being formed by a single sheet metal member having inwardly turned right angled flanges along all edges thereof except the outboard edges of said ends, said end edges being curved to fit the curvature of said main shell and being arc welded to said welding beads to form three-way welded joints, the outboard edge of said bottom being welded to said main shell, a second sheet metal member forming the top and inboard end of said lateral shell and being arc welded to said first named sheet metal member in overlapping relation with said flanges thereon, said top being welded in overlapping relation with said main shell, and said main shell having holes therethrough within the area bounded by said welds to provide communication between the interiors of said shells.

FRED PRIOR.

REFERENCES CITED

The following references are of record in the file of this patent:

UNITED STATES PATENTS

| Number    | Name         | Date          |
|-----------|--------------|---------------|
| 1,341,215 | Kramer       | May 25, 1920  |
| 2,181,772 | Snyder       | Nov. 28, 1939 |
| 2,276,963 | Griffin      | Mar. 17, 1942 |
| 2,314,298 | Welch        | Mar. 16, 1943 |
| 2,445,275 | Lintern et al. | July 13, 1948 |